No. 688,347. Patented Dec. 10, 1901.
A. SCHULER.
COMBINED CALIPERS AND DEPTH GAGE.
(Application filed July 29, 1901.)
(No Model.)
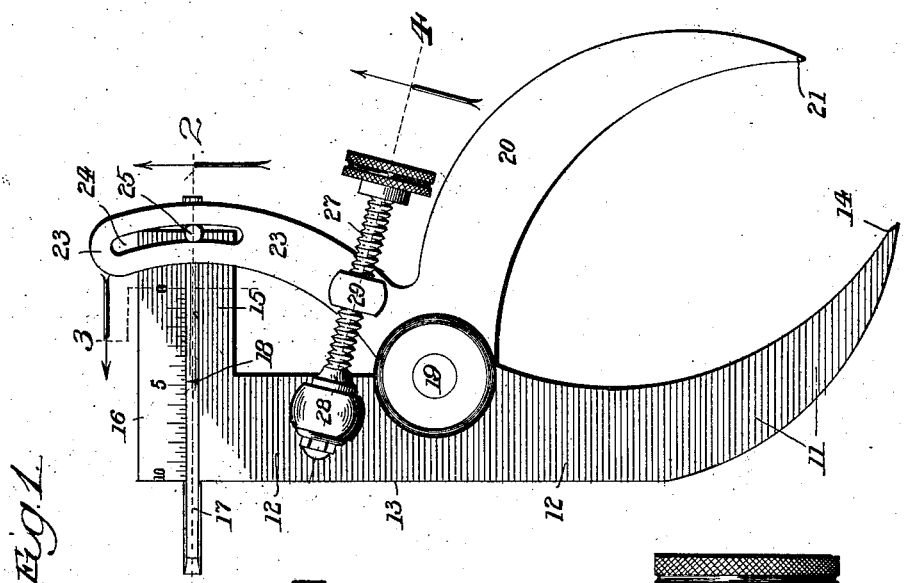
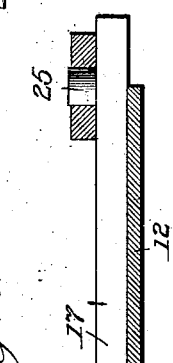
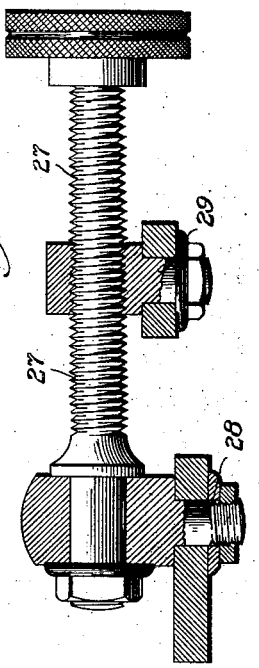
Witnesses:
Inventor.
Adolph Schuler,
By Dwight B Cheever
Atty.
THE NORRIS PETERS CO., PHOTO-LITHO., WASHINGTON, D. C.

UNITED STATES PATENT OFFICE.

ADOLPH SCHULER, OF CHICAGO, ILLINOIS.

COMBINED CALIPERS AND DEPTH-GAGE.

SPECIFICATION forming part of Letters Patent No. 688,347, dated December 10, 1901.

Application filed July 29, 1901. Serial No. 70,097. (No model.)

*To all whom it may concern:*

Be it known that I, ADOLPH SCHULER, a citizen of the United States, residing at Chicago, in the county of Cook and State of Illinois, have invented new and useful Combined Calipers and Depth-Gage, of which the following is a specification in its best form now known to me, reference being had to the accompanying drawings, in which similar numerals indicate the same parts throughout the several views.

My invention relates to a combined caliper and depth-gage; and the object of my invention is to provide such an instrument for the use of die-sinkers and other machinists in which the act of measurement of a particular part by the calipers will automatically set the depth-gage at a predetermined proportional part (preferably half) of the measurement of the caliper, thereby doing away with the mathematical calculation required in the ordinary process, which consists in first measuring the piece with the calipers, then measuring on a scale the distance between caliper-points, then dividing the measurement by two, (or the other proper figure,) and then taking a rule or scale and setting an independent depth-gage to indicate the proper proportional distance as indicated by the quotient of the above division.

My invention consists in a gage capable of accomplishing the above objects and in the details hereinafter more fully described and shown.

In the drawings, Figure 1 is a front view of an instrument embodying my invention in its preferred form. Figs. 2, 3, and 4 are detail views taken, respectively, on lines 2, 3, and 4 of Fig. 1.

Again referring to the drawings, the numeral 12 indicates the main frame of the instrument, which has one side 13 cut away in the form of a straight-edge and has its front end formed in the curved caliper-arm 11, terminating in the caliper-point 14. On the rear end of this frame 12 is an arm 15, having an edge 16 at right angles to the straight-edge 13, the two edges 13 and 16 forming the sides of a machinist's try-square. Slidably mounted in a groove in the frame 12, as shown in Fig. 3, is the depth-rod 17. On this depth-rod I preferably provide a pointer-mark 18, adapted to indicate distance on the dimension-scale "0, 5, 10." (Shown in Fig. 1.) The divisions of this scale may of course correspond to any scale desired.

Pivoted to the frame 12 at 19 I provide a movable caliper-arm 20, of the same length as the arm 14, heretofore described, so that when the calipers are closed the two ends 21 and 14 touch each other. In the preferred form of construction, where it is desired that the depth-gage shall read just half the measurement of the piece calipered, the distance from the center 19 to the ends 14 and 21 is just twice the perpendicular distance from the same center 19 to the center line 2 of the depth-rod 17. Integral with or rigidly secured to caliper-arm 20 is a lever-arm 23, having cut in it a cam-slot 24, which fits over a pin 25 in the upper end of depth-rod 17. The radius of this cam-slot is such and it is so located and proportioned that as the arms 20 and 23 are moved and the pin 25 is moved backward and forward in the cam-slot the depth-rod 17 will be moved a vertical distance exactly one-half of the distance the caliper-points 14 and 21 are moved apart—that is to say, one-half the distance in the preferred form shown, the proper proportioned distance in any other form selected.

In order to give the instrument an accurate adjustment, I connect the frame 12 and the arm 23 through swivel-joints 28 by a slow-motion adjusting-screw 27. This adjusting-screw may be omitted, if desired, and the instrument worked by hand.

In the operation of my invention I turn the adjusting-screw 27, and thus move the caliper-points 14 and 21 until they just fit over the object to be measured for die-sinking. In moving the arm 20 to do this the arm 23 has moved the cam-slot 24 over pin 25 and shoved depth-rod 17 out below edge 13, as shown in Fig. 1, and because of the construction heretofore described the length of this depth-rod below the edge 13 will be just one-half the distance between caliper ends 14 and 21, or the measurement of the object between them. I now remove the caliper from the article measured and insert the depth-rod 17 in the die I am working upon, the straight-edge 13 resting on the top face of the die.

I do not wish to be understood as limiting myself to the exact details of construction, which may be varied within reasonable limits without departing from my invention.

Having thus described my invention, what I claim as new, and desire to secure by Letters Patent, is—

1. A combined caliper and depth-gage, consisting of a base member, having on one side a straight-edge, a depth-rod adapted to move at substantially right angles to said straight-edge, a rigid caliper-arm extending from said base, another movable caliper-arm pivoted to said base, and a cam connection between said movable caliper-arm and said depth-rod whereby when the said caliper-arms are moved apart a fixed distance the end of said depth-rod is moved a certain predetermined portion of said fixed distance below said straight-edge, for the purposes set forth.

2. A combined caliper and depth-gage, consisting of a base member, having on one side a straight-edge, a depth-rod adapted to move at substantially right angles to said straight-edge, a rigid caliper-arm extending from said base, another movable caliper-arm pivoted to said base, a cam connection between said movable caliper-arm and said depth-rod whereby when said caliper-arms are moved apart a fixed distance the end of said depth-rod is moved a certain predetermined portion of said fixed distance below said straight-edge, and an adjusting mechanism adapted to regulate the motion of said calipers, for the purposes set forth.

3. A combined caliper and depth-gage, consisting of a base member having on one side a straight-edge, a depth-rod adapted to move at substantially right angles to said straight-edge, a rigid caliper-arm extending from said base, another movable caliper-arm pivoted to said base, a lever-arm rigid with said movable caliper-arm, and a cam in said lever-arm engaging said depth-rod; the shape of said cam being such that the movement of the depth-rod below the straight-edge is always the same predetermined proportion of the distance the caliper-points are moved toward or from each other, for the purposes set forth.

4. A combined caliper and depth-gage consisting of a base member having on one side a straight-edge, a depth-rod adapted to move at substantially right angles to said straight-edge, a rigid caliper-arm extending from said base, another movable caliper-arm pivoted to said base, a lever-arm rigid with said movable caliper-arm, a cam in said lever-arm engaging said depth-rod; the shape of said cam being such that the movement of the depth-rod below the straight-edge is always the same predetermined proportion of the distance the caliper-points are moved toward or from each other, and an adjusting-screw to regulate the motion of said calipers, for the purposes set forth.

5. A combined caliper and depth-gage having on one side a straight-edge, at one end a try-square and at the other end a rigid caliper-arm, a depth-rod adapted to move along said square at substantially right angles to said straight-edge, a movable caliper-arm pivoted to said base having its end meeting the end of the fixed caliper-arm, a lever-arm extending from said movable caliper-arm, and a cam in said lever-arm engaging said depth-rod, the shape of said cam being such that the movement of the depth-rod below the straight-edge is always the same predetermined proportion of the distance the caliper-points are moved toward or from each other, substantially as described for the purposes set forth.

6. A combined caliper and depth-gage having on one side a straight-edge, at one end a try-square and at the other end a rigid caliper-arm, a depth-rod adapted to move along said square at substantially right angles to said straight-edge, a movable caliper-arm pivoted to said base having its end meeting the end of the fixed caliper-arm, a lever-arm extending from said movable caliper-arm, a cam in said lever-arm engaging said depth-rod, the shape of said cam being such that the movement of the depth-rod below the straight-edge is always the same predetermined proportion of the distance the caliper-points are moved toward or from each other, and an adjusting-screw adapted to regulate the motion of said calipers.

ADOLPH SCHULER.

Witnesses:
OTTO G. HOFFMAN,
DWIGHT B. CHEEVER.